United States Patent

Stuntz et al.

[11] Patent Number: 6,014,006
[45] Date of Patent: Jan. 11, 2000

[54] INDUCTION MOTOR CONTROL SYSTEM WITH SPEED AND FLUX ESTIMATION

[75] Inventors: Ross Maxwell Stuntz, Birmingham, Mich.; Vladimir Aleksandrovich Bondarko, St. Petersburg, Russian Federation; Alexander Timofeevich Zaremba, Dearborn Heights, Mich.

[73] Assignee: Ford Global Technologies, Inc., Dearborn, Mich.

[21] Appl. No.: 09/339,485

[22] Filed: Jun. 24, 1999

[51] Int. Cl.[7] ....................................................... H02P 7/63
[52] U.S. Cl. ........................... 318/804; 318/799; 318/801; 318/811
[58] Field of Search ...................................... 318/727, 767, 318/798–801, 804, 805, 807–811

[56] References Cited

U.S. PATENT DOCUMENTS

| | | | |
|---|---|---|---|
| 5,162,727 | 11/1992 | Hindsberg et al. | 324/158 MG |
| 5,463,301 | 10/1995 | Kim | 318/801 |
| 5,510,689 | 4/1996 | Lipo et al. | 318/809 |
| 5,541,488 | 7/1996 | Bansal et al. | 318/801 |
| 5,559,419 | 9/1996 | Jansen et al. | 318/808 |
| 5,565,752 | 10/1996 | Jansen et al. | 318/807 |
| 5,729,113 | 3/1998 | Jansen et al. | 318/799 |
| 5,818,192 | 10/1998 | Nozari | 318/609 |

*Primary Examiner*—Bentsu Ro
*Attorney, Agent, or Firm*—Mark S. Sparschu

[57] ABSTRACT

Method of controlling torque of a multi-phase induction motor (10) includes estimating rotor speed as a rational function of filtered stator current $i_{s0}$ and voltage $u_0$ and first and second order derivatives of the filtered stator current and first order derivative of the filtered stator voltage, estimating rotor flux from said estimated rotor speed, estimating rotor flux angle from said estimated rotor flux, and using the estimated rotor flux angle to control motor torque.

10 Claims, 1 Drawing Sheet

INDUCTION MOTOR CONTROL SYSTEM WITH SPEED AND FLUX ESTIMATION

BACKGROUND OF THE INVENTION

1. Field of the Invention

The present invention relates to control systems for induction motors.

2. Description of Related Art

In recent years, there has been substantial research on advanced control systems for controlling induction motors without rotational transducers to achieve high dynamic performance of induction motor drives. A major element of these control systems has been the estimation of the rotor position or the position of the rotor flux without using a rotor position sensor. The techniques used for these purposes can be divided into two groups: a) tracking machine spatial saliencies and b) using a variety of control methods for speed and flux estimation.

The spatial saliencies tracking methods require injection of the separate high frequency carrier signal and work best at low speed. They are based on the accurate analysis of machine physical structure irregularities and have intrinsic limitations originating from the requirements of separation of fundamental and carrier frequencies and detection of low amplitude spatial information signal.

The control methods from the second group rely on different control techniques. One of the approaches is based on augmentation of the plant to include dynamics of unknown parameters and use of state dependent Riccati equation filter methodology. A particular control method employs two complementary speed and flux observers or estimators. The main high gain speed and flux estimator works in the motoring and generating region and requires the knowledge of motor speed sign. The auxiliary estimator operates in generating and braking modes but can be justified if motor speed varies sufficiently slowly. However, the switching between the two estimators can cause divergence when the induction motor is operated at low speed under large load. The high gain estimator is utilized in a reference frame related with a flux estimation vector. Rigorous closed loop analysis taking into account rotor resistance variation, and error in estimation of rotor flux and speed provides conditions under which asymptotic torque tracking is achieved.

An object of the present invention is to provide method and apparatus for controlling an induction motor using pseudo (filtered) electrical current and voltage signals and observable time derivatives thereof as inputs to a system of linear algebraic equations representing motor dynamics.

SUMMARY OF THE INVENTION

The present invention provides method and apparatus for controlling an induction motor wherein a system of linear algebraic equations is developed to define a speed observer or estimator based on motor dynamics. The speed observer equations have rotor speed as the only unknown variable and have pseudo (filtered) electrical current and voltage signals and observable derivatives thereof as inputs. Rotor speed is estimated as a rational function of the measured and observable variable stator current and voltage inputs. Rotor flux then is estimated directly from rotor speed using an induction motor equation. Rotor flux angle is determined from rotor flux for use in controlling torque of the induction motor.

BRIEF DESCRIPTION OF THE DRAWINGS

The sole

DETAILED DESCRIPTION OF THE PREFERRED EMBODIMENT

Figure 1:
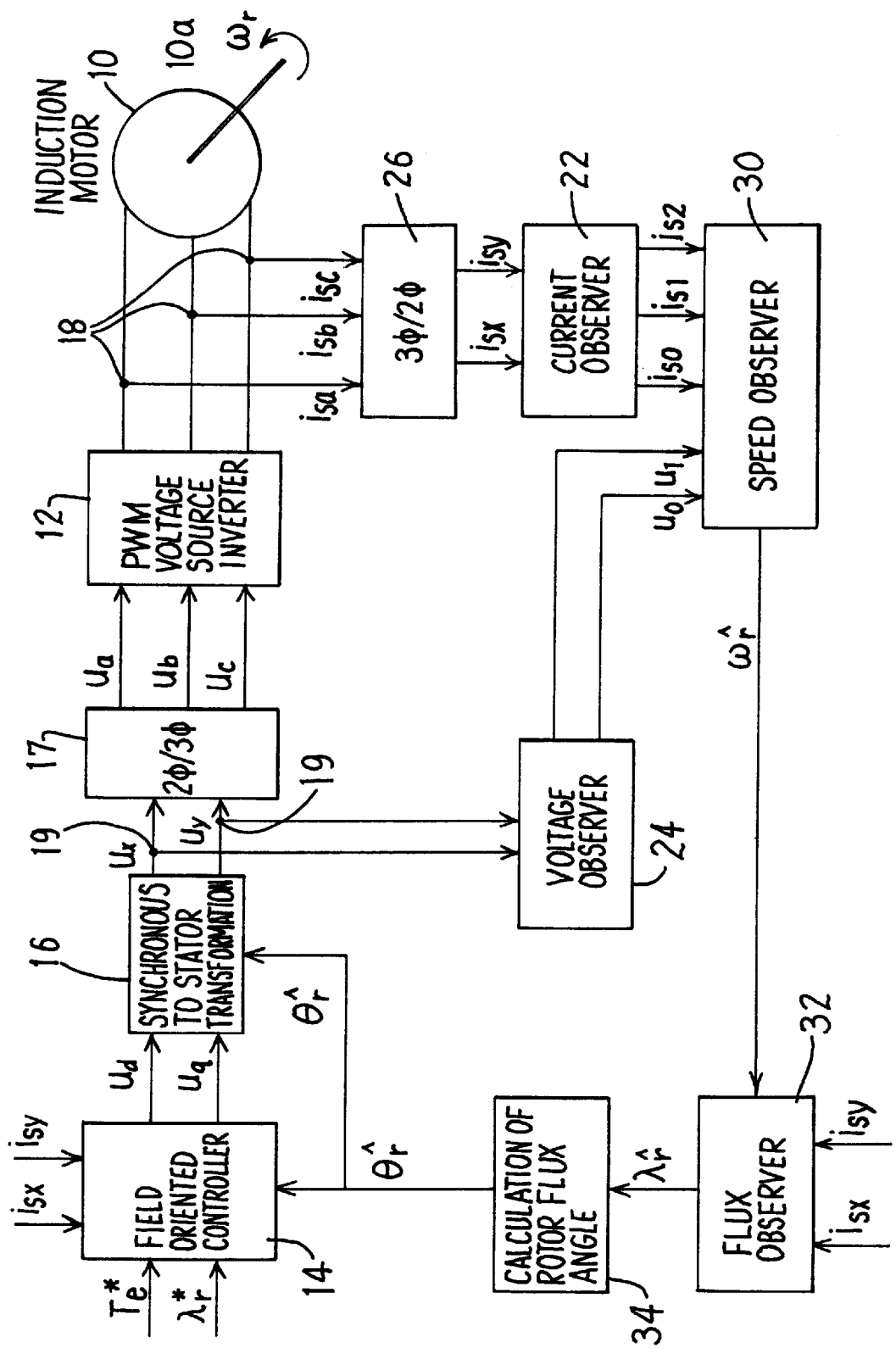
FIG. 1 is a schematic view of an induction motor and control system pursuant to an embodiment of the invention.

Referring to the FIGURE, a block diagram of a motor control system in accordance with an embodiment of the present invention is illustrated. In particular, an induction motor 10 is shown driven by a pulse width modulating (PWM) voltage source inverter 12, a field oriented controller 14, synchronous-to-stationary frame transformation block 16, two to three phase transformation block 17, a stator current observer 22, stator voltage observer 24, three to two phase transformation block 26, a speed observer or estimator 30, and a flux observer 32 providing estimated flux values to rotor flux calculator 34.

Polyphase current rotating in the same direction as, but faster than, the rotor 10a of the induction motor 10 will create a torque in a direction so as to aid in rotor rotation. In this operational mode, net electrical power flow is into the motor electrical terminals, and the motor 10 is considered to be in a "motoring" mode. Conversely, polyphase currents rotating slower than the motor create a torque in a direction opposing the rotor rotation. Net electrical power flow is thus out of the motor electrical terminals, and the motor 10 is considered to be in a "generating" mode.

Controller 14 sends stator voltage commands $u_d$ and $u_q$ (d, q reference frame) to transform blocks 16, 17 which rotate the voltage commands from the synchronous to the stationary frames and, in turn, send transformed commands $u_a$, $u_b$, $u_c$ to inverter 12 for control of the motor 10. Stator current observer 22 receives measured current signals from current sensors 18 and transform block 26, which rotates the measured current signals $i_{sa}$, $i_{sb}$, and $i_{sc}$ from the three phase frame to two phase frame to provide measured stator currents $i_{sx}$ and $i_{sy}$ to the current observer 22. The current observer 22 generates pseudo currents $i_{s0}$, $i_{s1}$, $i_{s2}$ as described below and sends them to speed observer or estimator 30.

The voltage observer 24 receives commanded stator voltage signals $u_x$ and $u_y$ calculated in the stationary frame and generates pseudo voltage signals $u_0$ and $u_1$ (as described below) and sends them to speed observer or estimator 30.

The speed observer 30 estimates the rotational electrical speed of rotor 10a by processing a system of algebraic equations to be described below using the pseudo stator current signals $i_{s0}$, $i_{s1}$, $i_{s2}$ and pseudo stator voltage signals $u_0$, $u_1$ as inputs to the equations.

The estimated rotor speed, $\hat{\omega}_r$ is sent to the flux observer 32 which estimates the rotor flux, $\hat{\lambda}_r$, directly from rotor speed using an induction motor equation described below. The rotor flux is estimated directly from the rotor speed and stator current signals. The estimated rotor flux is used by the rotor flux angle calculator 34 to calculate the rotor flux angle $\hat{\Theta}_r$. The rotor flux angle is used with the torque command, $T_e^*$, and rotor flux command, $\lambda_r^*$, and measured stator currents $i_{sx}$, $i_{sy}$ to control induction motor 10 via conventional techniques such as indirect field orientation methods incorporating slip frequency calculator and current regulator. Current observer 22, voltage observer 24, speed observer 30, flux observer 32, and flux angle calculator 34 are embodied in a microprocessing system of a motor control unit.

The estimated rotor flux angle, $\hat{\Theta}_r$, is sent to transform block 16 for purposes of transforming voltage control signal from a synchronous frame to stator stationary frame.

A dynamic model of a three phase induction machine 10, in a conventional stationary stator reference frame (x, y) is as follows:

$$\frac{d\Theta}{dt} = \omega \quad (1)$$

$$\frac{d\omega}{dt} = -\frac{3}{2}\frac{n_p M}{2mL_r}\lambda_r^T J i_s - T_L/m \quad (2)$$

$$\frac{d\lambda_r}{dt} = \left(-\frac{R_r}{L_r}I + n_p\omega J\right)\lambda_r + \frac{R_r}{L_r}M i_s \quad (3)$$

$$\frac{d i_s}{dt} = -\frac{M}{\sigma L_s L_r}\left(-\frac{R_r}{L_r}I + n_p\omega J\right)\lambda_r - \frac{1}{\sigma L_s}\left(R_s + \frac{M^2 R_r}{L_r^2}\right)i_s + \frac{1}{\sigma L_s}u_s \quad (4)$$

where $$I = \begin{pmatrix} 1 & 0 \\ 0 & 1 \end{pmatrix}, \quad J = \begin{pmatrix} 0 & -1 \\ 1 & 0 \end{pmatrix}.$$

Here the variables $\Theta$ and $\omega$ are the angular position and mechanical speed of the rotor 10a, $\lambda_r$, $u_s$ are rotor flux, stator current and voltage in the stator frame of reference (x, y), respectively. $\lambda_r^T$ is a transposed vector for $\lambda_r$.

The parameters $R_r$, $R_s$ are rotor and stator resistances, M is a mutual inductance, $Lr=M+L_{1r}$, $L_s=M+L_{1s}$ are rotor and stator inductances, $\sigma=1-M^2/L_s L_r$ is the leakage parameter, m is the moment of inertia of the motor, $n_p$ is the number of pole pairs, and $T_L$ is an external load torque.

For vector control of induction motor 10, it is required to measure or estimate rotor mechanical speed $\omega$. Then the necessary stator frequency command $\omega_s^*$ can be obtained by summing the commanded slip frequency $\omega_s^*$ with the measured rotor speed $\omega$:

$$\omega_e^* = n_p\omega + \omega_s^* \quad (5)$$

where $$\omega_s^* = \frac{2}{3n_p}T_e^*\frac{R_r}{(\lambda_r^*)^2} \quad (6)$$

and $T_e^*$, $\lambda_r^*$ are reference (commanded) values of torque and rotor flux.

Integrating electrical frequency signal $\omega_e^*$ (5) provides information about orientation of rotor flux which allows separation of the problems of flux control and reference torque tracking. An object of the invention is to design the speed observer 30 for speed estimation and the flux observer 32 for flux estimation using only information about stator current signals $i_{sx}$, $i_{sy}$ and stator voltage signals $u_x$, $u_y$.

The speed observer design assumes that all motor parameters have constant known values. To further simplify the problem, the rotor speed $\omega$ is assumed to be constant, but unknown. The second assumption can be justified by the fact that actual rotor speed varies slowly as compared to rotor flux and stator current. Rotor speed changes can be neglected in design of the speed observer 30.

The speed observer 30 may be briefly described as follows:

Due to assumption $\omega \approx$ constant, the last two equations of the dynamic model (3), (4) are sufficient to describe the dynamics of induction motor 10.

These equations (3), (4) are linear and allow elimination of unobservable flux and obtainment of a differential equation having stator current and voltage signals only.

The same equations (3), (4) are valid for filtered versions of current and voltage, whose derivatives are observable.

Since rotor velocity is the only unknown variable of the equations, it may be calculated as a rational function of filtered current, voltage and their observable derivatives.

Having estimated rotor speed, we can evaluate flux directly from equation (3).

The speed observer 30 embodies equations (3), (4) rewritten as follows:

$$\frac{d i_s}{dt} = -\gamma i_s + \beta A\lambda_r + \delta u \quad (7)$$

$$\frac{d\lambda_r}{dt} = -A\lambda_r + \eta M i_s \quad (8)$$

where $$A = \begin{pmatrix} \eta & \omega_r \\ -\omega_r & \eta \end{pmatrix} = \eta I - \omega_r J, \quad (9)$$

where $i_s=(i_{sx}, i_{sy})$, $u=(u_x, u_y)$, $\omega_r$ is rotor electrical speed and $\omega_r = n_p\omega$, u is stator voltage, $$\gamma = \delta\left(R_s + \frac{M^2 R_r}{L_r^2}\right), \quad \delta = \frac{1}{GL_s}, \quad \beta = \frac{\delta M}{L_r}, \quad \text{and } \eta = \frac{R_r}{L_r}.$$

Differentiating equation (7) and eliminating $i_r$ by using equation (8) we get:

$$\frac{d^2 i_s}{dt^2} = -\gamma\frac{d i_s}{dt} + \beta A\frac{d\lambda_r}{dt} + \delta\frac{du}{dt} = \quad (10)$$

$$= -\gamma\frac{d i_s}{dt} + \beta A\{-A\lambda_r + \eta M i_s\} + \delta\frac{du}{dt} =$$

$$= -\gamma\frac{d i_s}{dt} + \beta\eta M A i_s - A\left(\frac{d i_s}{dt} + \gamma i_s - \delta u\right) + \delta\frac{du}{dt}.$$

Then, $$\frac{d^2 i_s}{dt^2} + \gamma\frac{d i_s}{dt} - \delta\frac{du}{dt} = $$

$$\eta\left\{(\beta\eta M - \gamma)i_s - \frac{d i_s}{dt} + \delta u\right\} - \omega_r J\left\{(\beta\eta M - \gamma)i_s - \frac{d i_s}{dt} + \delta u\right\}.$$

Equation (10) can be represented in the form:

$$a + Jb\cdot\omega_r = 0 \quad (11)$$

where a and b are 2-vectors as follows:

$$a = \left\{\frac{d^2}{dt^2} + (\gamma + \eta)\frac{d}{dt} - \eta(\beta\eta M - \gamma)\right\}i_s - \delta\left\{\frac{d}{dt} + \eta\right\}u, \quad (12)$$

$$b = \left\{-\frac{d}{dt} + (\beta\eta M - \gamma)\right\}i_s + \delta u. \quad (13)$$

Thus, we get an overdetermined linear algebraic system (11) with respect to $\omega_r$. Minimizing mean square residual $|a + Jb\omega_r|^2$ gives an estimation of the rotor speed:

$$\omega_r = \frac{b^t J a}{|b|^2} \quad (14)$$

where $b^t$ represents the transpose of the vector b. Equation (14) contains derivatives of current and voltage signals and can not be used directly to determine rotor speed. To resolve this problem, low pass filtered versions of stator current and stator voltage are introduced by current observer 22 and voltage observer 24 as pseudo current $i_{s0}$ and voltage $u_0$ as follows $$\left(\frac{d}{dt} + G\right)^2 i_{s0} = i_s \text{(current observer)}, \quad (15)$$

$$\left(\frac{d}{dt} + G\right)^2 u_0 = u \text{(voltage observer)}$$

where G>0 and G is the filter gain.

Equation (15) provides pseudo (filtered) current and voltage $i_{s0}$ and $u_0$ from measured stator current $i_s$ and stator voltage u.

Substituting (15) into (11) gives $$0 = a + Jb \cdot \omega_r = \left(\frac{d}{dt} + G\right)^2 (a_G + Jb_G \cdot \omega_r) \quad (16)$$

where $$a_G = \left\{\frac{d^2}{dt^2} + (\gamma + \eta)\frac{d}{dt} - \eta(\beta\eta M - \gamma)\right\} i_{s0} - \quad (17)$$
$$-\delta\left\{\frac{d}{dt} + \eta\right\} u_0,$$

$$b_G = \left\{-\frac{d}{dt} + (\beta\eta M - \gamma)\right\} i_{s0} + \delta u_0. \quad (18)$$

This means that:

$$a_G + Jb_G \cdot = \epsilon \quad (19)$$

where $\epsilon$ is a small number and $\epsilon \to 0$ exponentially as t (time)$\to\infty$; or, roughly speaking, we can use for speed estimation the following equation:

$$a_G + Jb_G \cdot \hat{\omega}_r = 0. \quad (20)$$

Therefore, we get:

$$\hat{\omega} = \frac{b'_G Ja_G}{|b_G|^2} \quad (21)$$

where $$a_G = i_{s2} + (\gamma + \eta)i_{s1} - \eta(\beta\eta M - \gamma)i_{s0} - \quad (22)$$
$$-\delta u_1 - \delta\eta u_0$$

$$b_G = -i_{s1} + (\beta\eta M - \gamma)i_{s0} + \delta u_0. \quad (23)$$

Observable first and second order derivatives of pseudo (filtered) current $i_{s0}$ and first order derivative of pseudo (filtered) voltage $u_0$ are:

$$i_{s1} = di_{s0}/dt, \ i_{s2} = d^2 i_{s0}/dt^2, \ u_1 = du_0/dt \quad (24)$$

can be determined as a solution of equations:

$$\left(\frac{d}{dt} + G\right)^2 i_{s1} = di_s/dt, \quad (25)$$
$$\left(\frac{d}{dt} + G\right)^2 u_1 = du/dt,$$
$$i_{s2} = i_s - 2Gi_{s1} - G^2 i_{s0}.$$

The last equality in (25) follows from:

$$\left(\frac{d}{dt} + G\right)^2 i_{s2} = d^2 i_s/dt^2 \Rightarrow$$
$$\left(\frac{d}{dt} + G\right)^2 (i_{s2} - i_s) = d^2 i_s/dt^2 - \left(\frac{d}{dt} + G\right)^2 i_s =$$
$$= -2Gdi_s/dt - G^2 i_s.$$

Equations (21)–(25) define the speed observer 30. The speed is obtained as a solution (21) of the system of algebraic equation with pseudo (filtered) current and voltage signals $i_{s0}$, $i_{s1}$, $i_{s2}$ and $u_0$, $u_1$ as inputs.

The estimated rotor speed, $\hat{\omega}_r$, is sent to the flux observer 32 which estimates the rotor flux, $\hat{\lambda}_r$, using equation (3) rewritten as:

$$\frac{d\hat{\lambda}_r}{dt} = \hat{A}\lambda_r + \frac{R_r}{L_r} Mi_s. \quad (26)$$

where $$\hat{A} = \begin{pmatrix} \eta & \hat{\omega}_r \\ -\hat{\omega}_r & \eta \end{pmatrix} \quad (27)$$

is an exponentially stable matrix. The flux estimation signal $\hat{\lambda}_r$ is bounded for any bounded input $i_s$.

The estimated rotor flux is used by the rotor flux angle calculator 34 to calculate the rotor flux angle, $\hat{\Theta}_r$, using the equation:

$$\hat{\Theta}_r = \arcsin\frac{\hat{\lambda}_{rx}}{\sqrt{\hat{\lambda}_{rx}^2 + \hat{\lambda}_{ry}^2}} \quad (28)$$

where $\hat{\lambda}_{rx}$ and $\hat{\lambda}_{ry}$ are rotor flux with respect to stator reference frame (x, y).

The rotor flux angle is used with the torque command, $T_e^*$, and rotor flux command, $\lambda_r^*$, and measured current signals $i_{sx}$, $i_{sy}$ to control induction motor 10 via conventional techniques such as indirect field orientation methods incorporating slip frequency calculator and current regulator.

Speed Observer Optimized To Noise

To improve speed observer robustness with respect to noise in stator current measurements, a speed estimation is obtained as a solution of a continuous set of equations (20) over given time interval. The usual strategy is to put maximum weight on recent measurements and gradually discount previous measurements. Minimizing integral mean error:

$$\int_0^t e^{-gs} \left| a_G(t-s) + Jb_G(t-s)n_p\omega \right|^2 ds \to \text{mimimize} \quad (29)$$

where t is the time moment, s is a dummy variable of integration, and discount factor $e^{-gs}$ is selected as an exponential function, and leading to the following formulae:

$$\xi = b'_G Ja_G \quad (30)$$

$$\varphi = |b_G|^2 \quad (31)$$

$$d\Xi/dt + g\Xi = \xi \quad (32)$$

$$d\Phi/dt + g\Phi = \varphi \quad (33)$$

$$\hat{\omega}_r = \Xi(t)/\Phi(t) \quad (34)$$

where $b_G'$ is defined by equations (23)–(25), z,900 and $\Phi$ are the filtered versions of $\zeta$, $\phi$, respectively, and g is the filter gain.

By comparing (30)–(34) with (21), it can be concluded that the speed observer 30 obtained from minimization of (29) contains additional filtering (32), (33) of the denominator and numerator of expression (21).

Analysis of singular point

Considering the situation when b=0 and consequently a=0 in equation (11) provides a singular case at which induction motor speed can not be determined from system (11).

The motor dynamics for b=0 are governed by the equation $$\frac{di_s}{dt} - (\beta\eta M - \gamma)i_s = \delta u. \quad (35)$$

Substituting equation (35) into equation (7) we get:

$$\eta M i_s - A\lambda_r = 0 \quad (36)$$

From (36) it follows that at the singular point, the current and flux are related by algebraic equality. Transforming (36) to the (d, q) stator reference frame related with rotor flux, we get two equivalent equations:

$$M i_d = \lambda_d \quad (37)$$

$$\eta M i_q + \omega_r \lambda_d = 0 \quad (38)$$

where $$i_d = \frac{\lambda_r^t i_s}{|\lambda_r|},$$

$$i_q = -\frac{\lambda_r^t J i_s}{|\lambda_r|},$$

$$\lambda_d = \frac{\lambda_r^t \lambda_r}{|\lambda_r|}$$

where $i_d$ and $i_q$ are stator currents in the respective d and q stator references frames and $\lambda_d$ is flux in the (d, q) stator reference frame and $\lambda_r^t$ is the transpose of $\lambda_r$.

Comparing the equation (38) with (5), we find in the singular case that the electrical excitation frequency $\omega_e$ equals zero:

$$\omega_e = 0. \quad (39)$$

This corresponds to the special situation when the electrical field is not rotating and machine slip, s:

$$s = \frac{\omega_e - \omega_r}{\omega_e} \quad (40)$$

is infinite.

In the vicinity of the observer singular point, an additional speed observer (not shown) may be used if desired or needed and based on dynamic equations:

$$\eta M i_s - A\lambda_r = \frac{b}{\beta} \quad (41)$$

where $$b = -i_{s1} + (\beta\eta M - \gamma)i_s + \delta u. \quad (42)$$

From equations (41) and (8), the following formulae are generated:

$$\frac{d\lambda_r}{dt} = b \quad (43)$$

$$\omega_r = \frac{\eta M J i_s \lambda_r}{|\lambda_r|^2} + \frac{J b \lambda_r}{\beta |\lambda_r|^2} \quad (44)$$

which define flux and speed changes in the area where $\omega_e \cong 0$.

While the invention is described above in terms of specific embodiments thereof, it is not intended to be limited thereto but rather only to the extent set forth hereafter in the following claims.

What is claimed is:

1. A method of controlling torque of a multi-phase induction motor, comprising:

(a) estimating rotor speed as a function of filtered stator current and voltage signals and first and second order derivatives of the filtered stator current signal and first order derivative of the filtered stator voltage signal, (b) estimating rotor flux from said estimated rotor speed, (c) estimating rotor flux angle from said estimated rotor flux, and (d) using the estimated rotor flux angle to control motor torque.

2. The method of claim 1 wherein said current signal is filtered by:

$$\left(\frac{d}{dt} + G\right)^2 i_{s0} = i_s$$

where $i_s$ is stator current, $i_{s0}$ is a filtered pseudo stator current, and G is greater than 0.

3. The method of claim 2 wherein said voltage signal is filtered by:

$$\left(\frac{d}{dt} + G\right)^2 u_0 = u$$

where u is stator voltage, $u_0$ is a filtered pseudo stator voltage, and G is greater than 0.

4. The method of claim 3 wherein rotor speed is estimated as a solution of equations below:

$$\hat{\omega}_r = \frac{b_G^t J a_G}{|b_G|^2}$$

-continued $$a_G = i_{s2} + (\gamma + \eta)i_{s1} - \eta(\beta\eta M - \gamma)i_{s0} - \delta u_1 - \delta\eta u_0,$$

$$b_G = -i_{s1} + (\beta\eta M - \gamma)i_{s0} + \delta u_0$$

$$\left(\frac{d}{dt} + G\right)^2 i_{s1} = di_s/dt$$

$$\left(\frac{d}{dt} + G\right)^2 u_1 = du/dt$$

$$i_{s2} = i_s - 2Gi_{s1} - G^2 i_{s0}.$$

5. A method of estimating rotor speed of a multi-phase induction motor, comprising estimating rotor speed as a function of filtered stator current and voltage signals and first and second order derivatives of the filtered stator current signal and first order derivative of the filtered stator voltage signal, wherein said current signal is filtered by:

$$\left(\frac{d}{dt} + G\right)^2 i_{s0} = i_s$$

where $i_s$ is stator current, $i_{s0}$ is a filtered pseudo stator current, and G is greater than 0 and wherein said voltage signal is filtered by:

$$\left(\frac{d}{dt} + G\right)^2 u_0 = u$$

where u is stator voltage, $u_0$ is a filtered pseudo stator voltage, and G is greater than 0.

6. A rotor speed estimator, comprising:
(a) a current observer that filters measured stator current signals to provide pseudo current signals thereof,
(b) a voltage observer that filters measured stator voltage signals to provide pseudo voltage signals thereof,
(c) a rotor speed observer that estimates rotor speed as a function of the pseudo stator current and voltage signals and first and second order derivatives of the pseudo current signal and first order derivative of the pseudo voltage signal.

7. The estimator of claim 6 including a second rotor speed observer for a singular point of motor dynamics.

8. The estimator of claim 6 wherein said current observer filters said measured stator current signal by:

$$\left(\frac{d}{dt} + G\right)^2 i_{s0} = i_s$$

where $i_s$ is stator current, $i_{s0}$ is a filtered pseudo stator current, and G is greater than 0.

9. The method of claim 6 wherein said voltage observer filters said measured voltage signal by:

$$\left(\frac{d}{dt} + G\right)^2 u_0 = u$$

where u is stator voltage, $u_0$ is a filtered pseudo stator voltage, and G is greater than 0.

10. The method of claim 6 wherein rotor speed is estimated as a solution of:

$$\hat{\omega}_r = \frac{b_G^t J a_G}{|b_G|^2}$$

$$a_G = i_{s2} + (\gamma + \eta)i_{s1} - \eta(\beta\eta M - \gamma)i_{s0} - \delta u_1 - \delta\eta u_0,$$

$$b_G = -i_{s1} + (\beta\eta M - \gamma)i_{s0} + \delta u_0$$

$$\left(\frac{d}{dt} + G\right)^2 i_{s1} = di_s/dt$$

$$\left(\frac{d}{dt} + G\right)^2 u_1 = du/dt$$

$$i_{s2} = i_s - 2Gi_{s1} - G^2 i_{s0}.$$

* * * * *